US011820876B2

(12) United States Patent
Dong et al.

(10) Patent No.: US 11,820,876 B2
(45) Date of Patent: Nov. 21, 2023

(54) NON-ISOCYANATE POLYURETHANE PRODUCTS AND METHODS OF MAKING THE SAME

(71) Applicant: Alliance for Sustainable Energy, LLC, Golden, CO (US)

(72) Inventors: Tao Dong, Lakewood, CO (US); Philip T. Pienkos, Potsdam, NY (US)

(73) Assignee: Alliance for Sustainable Energy, LLC, Golden, CO (US)

(*) Notice: Subject to any disclaimer, the term of this patent is extended or adjusted under 35 U.S.C. 154(b) by 177 days.

(21) Appl. No.: 17/398,760

(22) Filed: Aug. 10, 2021

(65) Prior Publication Data

US 2022/0041830 A1  Feb. 10, 2022

Related U.S. Application Data

(60) Provisional application No. 63/063,666, filed on Aug. 10, 2020.

(51) Int. Cl.
*C08G 71/04* (2006.01)
*C08J 9/02* (2006.01)
*C08J 9/08* (2006.01)

(52) U.S. Cl.
CPC ............... *C08J 9/08* (2013.01); *C08G 71/04* (2013.01); *C08G 2110/005* (2021.01); *C08G 2110/0058* (2021.01); *C08G 2110/0066* (2021.01); *C08J 2203/02* (2013.01); *C08J 2375/12* (2013.01)

(58) Field of Classification Search
CPC .................................................. C08G 71/04
See application file for complete search history.

(56) References Cited

U.S. PATENT DOCUMENTS

| | | | |
|---|---|---|---|
| 3,255,219 A | 6/1966 | Young et al. | |
| 7,045,577 B2 * | 5/2006 | Wilkes | C08G 71/04 |
| | | | 528/480 |
| 11,104,763 B2 | 8/2021 | Dong et al. | |
| 2015/0024138 A1 | 1/2015 | Figovsky et al. | |
| 2020/0017638 A1 * | 1/2020 | Dong | C07C 271/20 |
| 2021/0261772 A1 * | 8/2021 | Zeller | C08L 75/12 |
| 2021/0347948 A1 | 11/2021 | Dong et al. | |
| 2021/0347949 A1 | 11/2021 | Dong et al. | |

OTHER PUBLICATIONS

"Epoxy Resins from BioRenewable Raw Materials", Mar. 30, 2017, CVC Thermoset Specialties, pp. 1-2.
Annunziata et al., "α,ω-Di(glycerol carbonate) telechelic polyesters and polyolefins as precursors to polyhydroxyurethanes: an isocyanate-free approach", Green Chemistry, 2014, vol. 16, No. 4, pp. 1947-1956.
Bähr et al., "Linseed and soybean oil-based polyurethanes prepared via the non-isocyanate route and catalytic carbon dioxide conversion", Green Chemistry, 2012, vol. 14, pp. 483-489.
Blattmann et al., "Flexible and Bio-Based NonisocyanatePolyurethane (NIPU) Foams", Macromolecular Materials and Engineering, 2016, vol. 301, pp. 944-952.
Clark et al., "Renewable Self-Blowing Non-isocyanate Polyurethane Foams from Lysine and Sorbitol", European Journal of Organic Chemistry, 2018, pp. 4265-4271.
Cornille et al., "A new way of creating cellular polyurethane materials: NIPU foams", European Polymer Journal, May 2015, vol. 66, pp. 129-138.
Doley et al., "Solvent and catalyst-free synthesis of sunflower oil based polyurethane through non-isocyanate route and its coatings properties", European Polymer Journal, 2018, vol. 102, 161-168.
Figovsky et al., "Features of reaction amino-cyclocarbonate for production of new type nonisocyanate polyurethane coatings", Macromolecular Symposia, 2002, vol. 187, No. 1, pp. 325-332.
Grignard et al., "CO2-blown microcellular non-isocyanate polyurethane (NIPU) foams: from bio- and CO2-sourced monomers to potentially thermal insulating materials", Green Chemistry, 2016, vol. 18, pp. 2206-2215.
Hu et al., "Biobased Reprocessable Polyhydroxyurethane Networks: Full Recovery of Crosslink Density with Three Concurrent Dynamic Chemistries", ACS Sustainable Chemistry & Engineering, 2019, vol. 7, No. 11, pp. 10025-10034.
Kathalewar et al., "Non-isocyanate polyurethanes: from chemistry to applications", RSC Advances, 2013, vol. 3, pp. 4110-4129.
Ke et al., "Non-isocyanate polyurethane/epoxy hybrid materials with different and controlled architectures prepared from a CO2-sourced monomer and epoxy via an environmentally-friendly route", RSC Advances, 2017, vol. 7, No. 46, pp. 28841-28852.
Javni et al., "Soy-based polyurethanes by nonisocyanate route", Journal of Applied Polymer Science, 2008, vol. 108, No. 6, pp. 3867-3875.
Javni et al., "Polyurethanes from soybean oil, aromatic, and cycloaliphatic diamines by nonisocyanate route", Journal of Applied Polymer Science, Apr. 2013, vol. 128, No. 1, pp. 566-571.
Laurens et al., "Accurate and reliable quantification of total microalgal fuel potential as fatty acid methyl esters by in situ transesterification", Analytical and Bioanalytical Chemistry, Apr. 2012, vol. 403, No. 1, pp. 167-178.
Maisonneuve et al., "Isocyanate-Free Routes to Polyurethanes and Poly(hydroxy Urethane)s", Chemical Reviews, 2015, vol. 115, pp. 12407-12439.
Ochiai et al., "Salt effect on polyaddition of bifunctional cyclic carbonate and diamine", Journal of Polymer Science Part A—Polymer Chemistry, Dec. 2005, vol. 43, No. 24, pp. 6282-6286.

(Continued)

*Primary Examiner* — Melissa A Rioja
(74) *Attorney, Agent, or Firm* — Michael A. McIntyre

(57) ABSTRACT

The present disclosure relates to a method for making a non-isocyanate polyurethane (NIPU) foam, where the method includes decomposing a blowing agent having at least one of an amine carbamate salt and/or an amine bicarbonate salt to form a diamine and $CO_2$ in the presence of a molecule comprising a plurality of cyclic carbonate functional groups and reacting the diamine with at least a portion of the cyclic carbonate functional groups to form the NIPU foam. In some embodiments of the present disclosure, the reacting and the decomposing may occur at substantially the same rate.

16 Claims, 13 Drawing Sheets

(56) References Cited

OTHER PUBLICATIONS

Park et al., "Catalytic Utilization of Carbon Dioxide to Polymer Blends via Cyclic Carbonate", Reaction Kinetics and Catalysis Letters, 1998, vol. 65, No. 2, pp. 219-226.

Pienkos et al., "The promise and challenges of microalgal-derived biofuels", Biofuels Bioproducts & Biorefining, Jul./Aug. 2009, vol. 3, No. 4, pp. 431-440.

Petrović et al., "Epoxidation of soybean oil in toluene with peroxoacetic and peroxoformic acids—kinetics and side reactions", The European Journal of Lipid Science and Technology, 2002, vol. 104, pp. 293-299.

Ren et al., "Development of Epoxy Foaming with CO2 as Latent Blowing Agent and Principle in Selection of Amine Curing Agent", Industrial & Engineering Chemistry Research, 2015, vol. 54, pp. 11056-11064.

Schmidt et al., "Erythritol Dicarbonate as Intermediate for Solvent- and Isocyanate-Free Tailoring of Bio-Based Polyhydroxyurethane Thermoplastics and Thermoplastic Elastomers", Macromolecules, 2017, vol. 50, pp. 2296-2303.

Tomita et al., "Model reaction for the synthesis of polyhydroxyurethanes from cyclic carbonates with amines: Substituent effect on the reactivity and selectivity of ring-opening direction in the reaction of five-membered cyclic carbonates with amine", Journal of Polymer Science Part A, 2001, vol. 39, No. 21, pp. 3678-3685.

Unverferth et al., "Renewable Non-Isocyanate Based Thermoplastic Polyurethanes via Polycondensation of Dimethyl Carbamate Monomers with Diols", Macromolecular Rapid Communictions, 2013, vol. 34, No. 19, pp. 1569-1574.

Warner et al., "3D printable non-isocyanate polyurethanes with tunable material properties", Polymer Chemistry, 2019, vol. 10, pp. 4665-4674.

Wulf et al., "Catalytic Systems for the Synthesis of Biscarbonates and Their Impact on the Sequential Preparation of Non-Isocyanate Polyurethanes", ACS Sustainable Chemistry & Engineering, 2020, vol. 8, pp. 1651-1658.

Yadev et al., "Polymers Based on Cyclic Carbonates as Trait d'Union Between Polymer Chemistry and Sustainable CO2 Utilization", ChemSusChem, 2019, vol. 12, pp. 724-754.

Yu et al., "Characterisation and kinetic study of carbon dioxide absorption by an aqueous diamine solution", Applied Energy, 2017, vol. 208, pp. 1308-1317.

Zhang et al., "Non-isocyanate poly(amide-hydroxyurethane)s from sustainable resources", Green Chemistry, 2016, vol. 18, pp. 4667-4681.

* cited by examiner

Top　　　　　　　　　　Bottom

Before foaming

After foaming

NON-ISOCYANATE POLYURETHANE PRODUCTS AND METHODS OF MAKING THE SAME

CROSS-REFERENCE TO RELATED APPLICATIONS

This application claims priority from U.S. Provisional Patent Application No. 63/063,666 filed on Aug. 10, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Polyurethane (PU) is one of the most commonly used polymers worldwide for various applications such as foams, coatings, elastomers, and adhesives. In 2016 PU ranked 6th among all polymers based on annual worldwide production. PU has been traditionally synthesized from a step-growth reaction between polyols and toxic isocyanates, which are produced by reacting corresponding amine compounds with toxic phosgene. Increasing regulatory scrutiny (e.g., from the United States Environmental Protection Agency and the European Union REACH regulation) has been implemented to isocyanates across the world. Also, isocyanates are sensitive to moisture, causing problems for stable storage. In addition, isocyanates and polyols are currently synthesized from depleting petrochemical resources. For these reasons and because of the growing demand for greener processes utilizing renewable resources, there is a need for methods that can synthesize PU materials via non-isocyanate routes to produce non-isocyanate polyurethanes (NIPUs). One of the major technical hurdles that hinder the commercialization of NIPU technologies is the low reactivity of reaction between cyclic carbonates and amines. Currently, most NIPU synthesis reactions require elevated temperatures, with reaction times of many hours or days. Therefore, among other things, a need remains to develop successful approaches for synthesizing NIPUs with rapid and effective reactions comparable to those used in conventional PU synthesis methods. Unlike traditional polyurethane using isocyanate and water to generate $CO_2$ as blowing reagent for foam production, there is no gas formation in NIPU polymerization. To overcome this issue, ozone-depletion fluorocarbons, flammable gas ($H_2$), petroleum-based blowing agents (e.g., pentane) and supercritical carbon dioxide have been used as blowing agents. However, these methods suffer from various problems in industrial applications. Therefore, there remains a need for producing foam NIPUs that overcome the problems associated with the production of traditional polyurethane foams.

SUMMARY

An aspect of the present disclosure is a method for making a non-isocyanate polyurethane (NIPU) foam, where the method includes decomposing a blowing agent having at least one of an amine carbamate salt and/or an amine bicarbonate salt to form a diamine and $CO_2$ in the presence of a molecule comprising a plurality of cyclic carbonate functional groups and reacting the diamine with at least a portion of the cyclic carbonate functional groups to form the NIPU foam. In some embodiments of the present disclosure, the reacting and the decomposing may occur at substantially the same rate.

In some embodiments of the present disclosure, the molecule may be derived from a biomass. In some embodiments of the present disclosure, the molecule may be derived from at least one of a soybean oil, a linseed oil, and/or an algae oil. In some embodiments of the present disclosure, the molecule may be produced by carbonating an unsaturated lipid or oil. In some embodiments of the present disclosure, the NIPU foam may have a density between about 0.01 $g/cm^3$ and about 0.80 $g/cm^3$. In some embodiments of the present disclosure, the decomposing may be accomplished by heating. In some embodiments of the present disclosure, the heating may be performed by at least one of conductive heating, radiative heating, and/or radio frequency heating. In some embodiments of the present disclosure, the heating may result in a temperature between about 50° C. and about 200° C. In some embodiments of the present disclosure, the diamine may include between 1 and 10 carbon atoms.

In some embodiments of the present disclosure, the diamine may be selected from the group consisting of a substituted or unsubstituted diaminoalkane. In some embodiments of the present disclosure, the NIPU foam may have the structure defined by

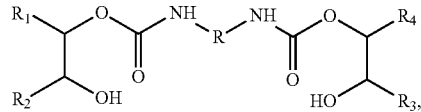

where each of $R_1$, $R_2$, $R_3$, and $R_4$ are independently selected from functional groups that include at least one of hydrogen and/or carbon, and where R is a linking group that includes carbon. In some embodiments of the present disclosure, the linking group may further include at least one of nitrogen, oxygen, phosphorus, and/or sulfur. In some embodiments of the present disclosure, $R_1$ and $R_2$ taken together with the carbons to which they are attached may form a lipid residue, and $R_3$ and $R_4$ taken together with the carbons to which they are attached may form a lipid residue. In some embodiments of the present disclosure, the lipid residue may be a substituted triglyceride. In some embodiments of the present disclosure, at least one of the functional groups (i.e., $R_1$, $R_2$, $R_3$, and $R_4$) may further include at least one of a nitrogen, oxygen, phosphorus, and/or sulfur.

An aspect of the present disclosure is a non-isocyanate polyurethane (NIPU) foam having the structure

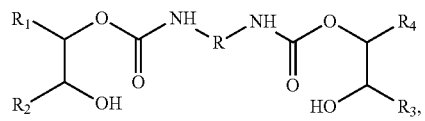

where each of $R_1$, $R_2$, $R_3$, and $R_4$ are independently selected from functional groups that include at least one of a hydrogen atom or a carbon atom, R is a linking group that includes carbon, a density between about 0.01 $g/cm^3$ and about 0.80 $g/cm^3$, and where the NIPU foam is bioderived.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

DETAILED DESCRIPTION

Figure 1:
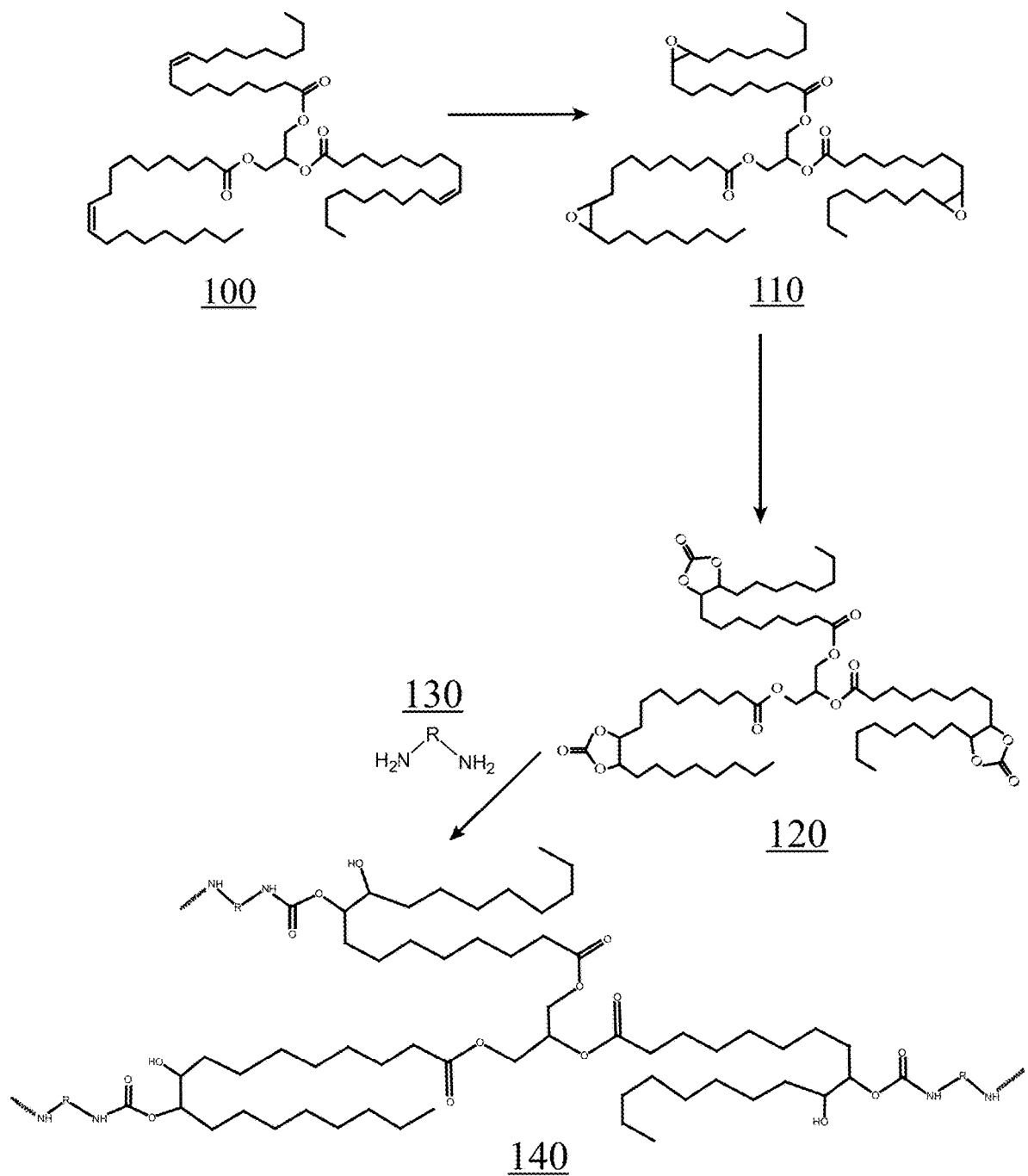
FIG. 1 illustrates an exemplary reaction route for converting unsaturated lipids to non-isocyanate polyurethanes (NIPUs), according to some embodiments of the present disclosure.

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to methods for producing non-isocyanate polyurethanes (NIPUs) and NIPU foams by reacting diamines with cyclic carbonated materials such as materials derived from polyunsaturated fatty acids (PUFAs). In some embodiments of the present disclosure, a diamine may be converted to an amine carbamate be reacting the diamine with carbon dioxide. As shown herein, subsequent reacting of the amine carbamate with a carbonated material may result in the release of gaseous carbon dioxide and recovery of the diamine, such that the diamine reacts with the cyclic carbonate groups, and the released $CO_2$ acts as a blowing agent resulting in the forming of the NIPU, to produce a NIPU foam. At low temperatures, amine carbamates are not reactive with cyclic carbonate groups and/or epoxy groups (for producing epoxy materials), allowing for the mixing of an amine carbonated salt with the other NIPU precursors for an extended period of time. Once mixed and ready for polymerization, the reaction may be initiated simply by heating to an elevated temperature, resulting in the decomposition of the amine carbamates to release $CO_2$ to provide the blowing gas and free the amine crosslinker to react with the available carbonated materials (e.g., PUFA-derived materials). The freed amine groups can then react with the cyclic carbonate groups to form the NIPU foams. In some embodiments of the present disclosure, an amine may react with $CO_2$ and water to produce amine bicarbonate salts, which can be decomposed to produce amine, $CO_2$, and water at elevated temperature. Therefore, amine bicarbonate salts can also be used as a bifunctional blowing and curing reagent to produce NIPU foams.

Thus, as described herein, diamines (and polyamines; e.g., triamines and/or amines containing more than three amine functional groups) may react with (e.g., crosslink) carbonated lipids (e.g., oils), including triglycerides, fatty acids and/or any compound having two or more carbonate groups to form polymers and/or resins. Physical and chemical properties of the resultant polymers and/or resins will vary with the composition of the diamines (and/or polyamines); e.g., structure, molecular weight, etc. Thus, using the materials and methods described herein, a wide range of polymers and/or resins may be designed and produced having a broad spectrum of physical properties and/or performance metrics. Carbonated lipids that may be reacted with diamines, amine carbamates, and/or amine bicarbonate salts may be derived from a variety of lipids including but not limited to triglycerides, diglycerides, monoglycerides, phospholipids, glycolipids, fatty acid esters, free fatty acids, fatty acid salts, fatty acid derived fatty alcohols, and/or hydroxyl fatty acids. In some embodiments of the present disclosure, compounds having two or more unsaturated double bonds, e.g., carbon-carbon double bonds, may be used to produce carbonated molecules that may be reacted as described herein, with cross-linking molecules (e.g., diamines) to produce novel resins and/or polymers. Examples of compounds having two or more unsaturated double bonds that may be suitable for some embodiments of the present disclosure include butadiene, linseed triglyceride oil, soybean triglyceride oil, hemp triglyceride oil, and/or cotton seed triglyceride oil.

Structure 1 illustrates the general structure of a diamine, according to some embodiments of the present disclosure.

Structure 1

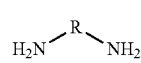

The R-group of the general diamine structure shown above may be any desirable organic linking group, including alkanes, alkenes, aromatic, and/or alkynes (e.g., saturated and/or unsaturated organic linking groups), that are branched and/or straight-chained. In addition, the R-group of a diamine may be further functionalized with at least one of a hydroxyl group, an amine group, an aryl group, an unsaturated hydrocarbon group (one or more aromatic ring structures, linear and/or branched), a carboxyl group, ketone, and/or a sulfur-containing group. In some embodiments of the present disclosure, the R-group may include at least one of carbon, hydrogen, oxygen, sulfur, nitrogen, and/or phosphorus.

FIG. 1 illustrates exemplary reactions for converting unsaturated lipids to epoxidized lipids, converting the epoxidized lipids to cyclic carbonated lipids, and reacting the carbonated lipids with diamines to produce NIPUs, according to some embodiments of the present disclosure. In the example of FIG. 1, an unsaturated lipid 100 having at least one carbon-carbon double bond may react, for example with a peroxycarboxylic acid, m-chloroperbenzoic acid, etc., to form an epoxidized lipid 110 having at least one epoxy group. The epoxidized lipid 110 may then react with $CO_2$ to form a carbonated lipid 120 having at least one 5-member cyclic carbonate group. Finally, the carbonated lipid 120 may react with a diamine 130 to form a NIPU 140. As shown in FIG. 1, the reaction of a diamine 130 with a carbonate may ring-open the carbonate, resulting in the forming of a NIPU 140 having secondary hydroxyl groups. However, the ring-opening reaction of a carbonate with a diamine 130 may also result in the forming of a NIPU 140 having primary hydroxyl groups, when at least one of $R_1$, $R_2$, $R_3$, and/or $R_4$ is a hydrogen atom. Further, a NIPU following the reactions summarized in FIG. 1 may include a mixture of both primary hydroxyl groups and secondary hydroxyl groups. A generalized reaction for reacting a diamine 130 with a carbonated lipid 120 is shown in Reaction 1 below. This illustrates that, depending on which side of the carbon double-bonded to the oxygen the ring opening occurs.

Reaction 1

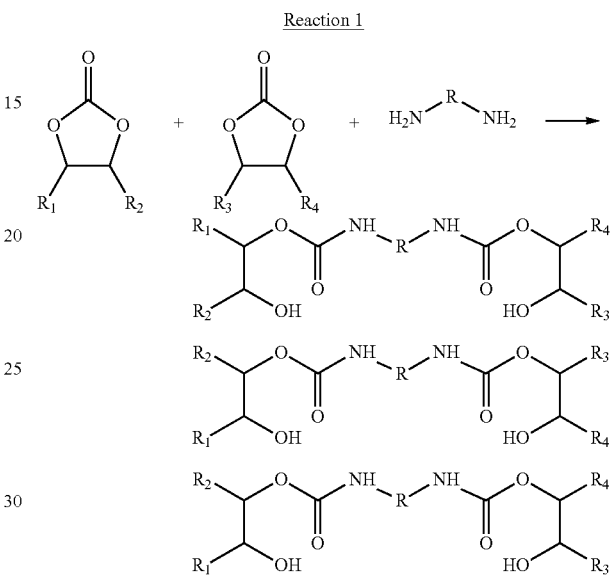

In Reaction 1 above, a first reactant having at least one carbonate group, a first functional group $R_1$, and a second functional group $R_2$ and a second reactant having at least one carbonate group, a third functional group $R_3$, and a fourth functional group $R_4$ may react with a diamine to form a polymer and/or resin. Thus, each functional group $R_1$, $R_2$, $R_3$, and/or $R_4$ may be the same or they may all be different functional groups, or there may be three groups that are the same, or two distinct pairs, etc. Each functional group $R_1$, $R_2$, $R_3$, and/or $R_4$ may include at least one of a saturated hydrocarbon chain and/or an unsaturated hydrocarbon chain, and these may be branched and/or straight chains. Further, each functional group $R_1$, $R_2$, $R_3$, and/or $R_4$ may include at least one of a single hydrogen atom, a carbonate group, a hydroxyl group, an amine group, an aryl group, an aromatic ring structures, a carboxyl group, ketone, and/or a sulfur-containing group. The number of carbonate groups included in each functional group $R_1$, $R_2$, $R_3$, and/or $R_4$, among other things, will determine whether relatively low molecular weight products are made (e.g., for examples having relatively few carbonate groups) or whether relatively high molecular weight products are made (e.g., for examples having relatively many carbonate groups). Similarly, the number of carbonate groups included in each functional group $R_1$, $R_2$, $R_3$, and/or $R_4$ will determine whether non-crosslinked polymers and/or molecules are made (e.g., for examples with zero and/or close to zero carbonate groups) are made or whether significantly cross-linked and/or branched resins are made (e.g., for examples having relatively many carbonate groups). Thus, in some embodiments of the present disclosure, at least one of the functional groups $R_1$, $R_2$, $R_3$, and/or $R_4$ will at least initially contain at least two carbonate group, which subsequently react with other diamine molecules to form additional linkages, resulting in the formation of polymers and/or resins.

In some embodiments of the present disclosure, carbonate group-containing materials for reacting with diamines to produce NIPUs may be obtained and/or derived from numerous sources, including lipids derived from at least one of canola seeds, soybeans, whey, meat, fermentation processes, and/or organic waste sources (e.g., food, fats, oils and waste-grease, municipal solid and/or liquid waste), etc. Lipids may be derived from at least one of soy, canola, corn, linseed, yeasts, fungi, algae, waste grease, and/or fish. Thus, examples of sources for bio-derived starting materials include algae, fungi, bacteria, yeast, waste sources (municipal, food, agricultural), and/or plants. The lipids can be modified into many forms (e.g., methyl ester, diester, polymer ester, diamide, polyamide, etc.) In some embodiments of the present disclosure, carbonated oil derived from feedstocks with polyunsaturated fatty acid (PUFA) may be utilized to produce NIPUs at relatively fast reaction rates. Also, the NIPU derived from such feedstocks may show improved performance for industrial applications. The experimental results herein indicate feedstocks derived from PUFAs can have higher reactivity in cyclic carbonate ring-opening due to the proximity of the carbonate groups.

In some embodiments of the present disclosure, Reaction 1 shown above may be modified to include a diamine that has been complexed with $CO_2$, such that when the complex is heated, the $CO_2$ is released as a gas and the diamine reconstituted, freeing the diamine to react with the carbonate groups, with the $CO_2$ acting as a blowing agent to produce a NIPU foam. Reaction 2 and Reaction 3 illustrate reactions between a diamine and $CO_2$ tor produce diamine-$CO_2$ complexes, according to some embodiments of the present disclosure.

Reaction 2

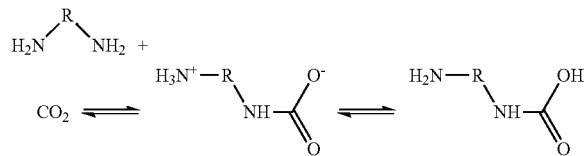

Reaction 3

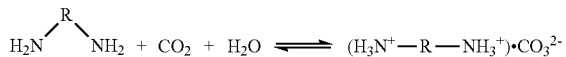

Figure 2:
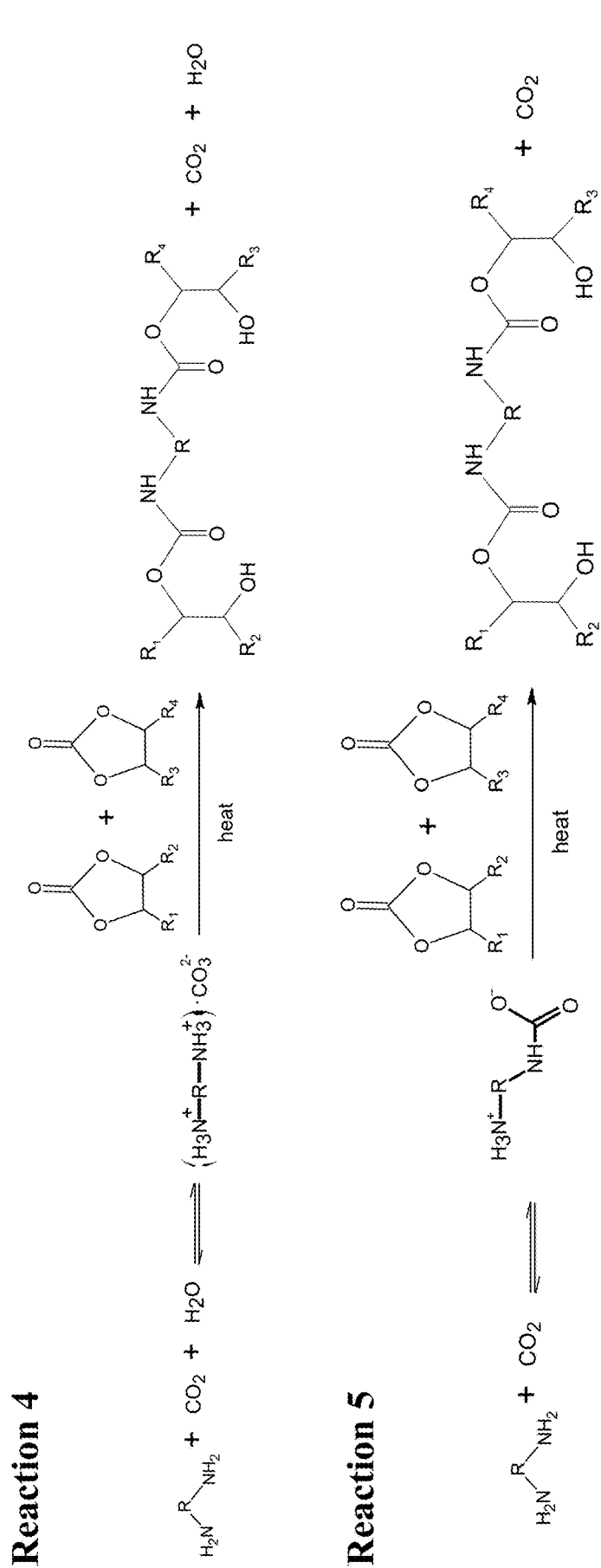
FIG. 2 illustrates two exemplary reaction routes for converting unsaturated lipids to non-isocyanate polyurethane foams, according to some embodiments of the present disclosure.

The diamine-$CO_2$ complex resulting from Reaction 2 is referred to as an amine carbamate. The diamine-$CO_2$ complex resulting from Reaction 3 is referred to as an amine bicarbonate salt. For the example utilizing a carbamate, combining Reaction 1 and Reaction 3 results in Reaction 4, which is summarized in FIG. 2. Combining Reaction 1 and Reaction 2 results in Reaction 5, also summarized in FIG. 2. As shown in FIG. 1, for the case where at least one of $R_1$, $R_2$, $R_3$, and/or $R_4$ include additional carbonate groups, additional diamine molecules may continue to react with the additional carbonate groups to form higher molecular weight materials, e.g., polymers and/or resins. In some embodiments of the present disclosure, a NIPU foam resulting from either Reaction 4 and/or Reaction 5 may have a volumetric density between about 0.02 $g/cm^3$ and about 0.6 $g/cm^3$. In some embodiments of the present disclosure, heating resulting in the thermal degradation of the amine carbamate and/or amine bicarbonate salt can be provided by conductive heating, radioactive heating, and/or radio frequency heating (e.g., microwave). As shown in Reaction 1 above, the foamed NIPUs resulting from Reaction 4 and/or Reaction 5 may result in the carbonate groups ring-opening to form primary hydroxyl groups and/or secondary hydroxyl groups, depending on whether at least one of $R_1$, $R_2$, $R_3$, and/or $R_4$ is a hydrogen atom.

Figure 12:
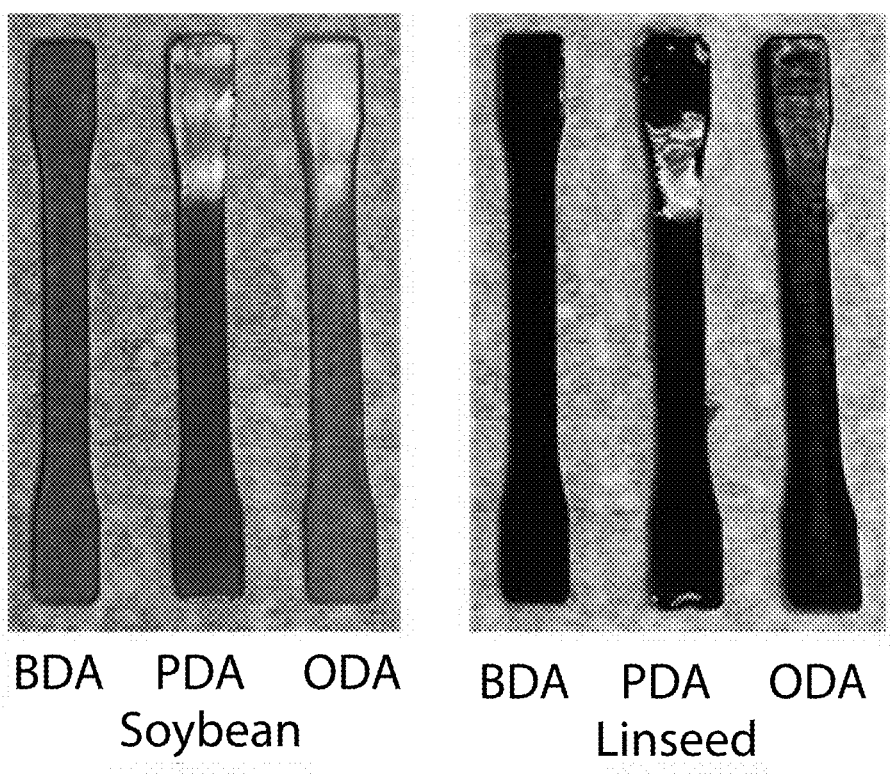
FIG. 12 illustrates NIPU samples derived from soybean and linseed oil, according to some embodiments of the present disclosure.

Production and Characterization of NIPU Resins:

Carbonated triglyceride precursors (i.e., carbonated oil) were used for NIPU resin production. Diamines, such as butane diamine (BDA), pentane diamine (PDA) and octane diamine (ODA), were respectively used as crosslinkers, reacted with the carbonated triglyceride precursors, to evaluate the effect of amine chain length on the tensile strength of the resultant polymers/resins. The carbonated oil and a diamine crosslinker were mixed at about 70° C. for between 0.5 minutes and 5 minutes before being poured into ASTM D638 Type II dog bone molds (see FIG. 12). The carbonated algae-mono and soybean oil took about 5 minutes under mixing to become a gel, while linseed oil reacted with diamines very quickly and became a gel within 1.5 minutes. The mixture of Algae-PUFA (96%) (or Algae-PUFA (83%)) oil and diamine was very viscous at 70° C. and the reaction proceeded extremely quickly and became a gel in less than 1 minute. (Note: the percentage value indicated in the various Algae-PUFA (x %) samples refers to the percentage of carbon-carbon double bounds present in the starting PUFAs that were successfully converted to epoxy groups, as shown in the first reaction of FIG. 1. In general, for the conditions tested herein, about 100% conversion was attained for the conversion of epoxy groups to carbonate groups.)

The performance of triglyceride-derived NIPUs were tested and the results are summarized in Table 1. The NIPU samples having more crosslinking generally demonstrated higher glass transition temperatures and higher Young's moduli. The soybean derived NIPU samples demonstrated low Young's modulus, and the FTIR result show that the soybean oil was not fully crosslinked and may have been a mixture of oligomers, resulting in the relatively decreased tensile performance. The linseed oil derived NIPU exhibited higher glass transition temperatures and remarkably higher tensile strengths. This is consistent with its high degree of crosslinking and quantitative polymerization. The Algae-PUFA (46%) derived NIPU displayed similar results to soybean NIPU, and the Algae-PUFA (67%) showed similar results to linseed NIPU. These results indicate that the algal oil containing PUFA is a versatile precursor that may be used to produce NIPUs for a wide range of applications by changing the degree of epoxidation and, as a result, the degree of carbonation, and subsequently, the degree of cross-linking. Also notable, is that increasing the chain length of the diamine crosslinker from C4 (BDA) to C8 (OCA) reduced the Young's modulus by a factor of 6, suggesting that short chain diamines, e.g., C1-C4, isophoronediamine, aromatic diamines, such as m-xylenediamine, ethylene diamine (C2) and/or propylene diamine (C3) could further increase the structural strength of the resultant NIPUs.

TABLE 1

Mechanical and thermal properties of NIPU products

| Carbonated oil | Diamine | Tg ° C. (DSC) | Young's Modulus (MPa) | | | Elongation at break (%) | | |
|---|---|---|---|---|---|---|---|---|
| Soybean | BDA | 1.26 | 3 | ± | 0 | 47 | ± | 4 |
|  | PDA | 11.3 | 2 | ± | 0 | 54 | ± | 4 |
|  | ODA | 14.72 | 3 | ± | 0 | 54 | ± | 2 |
| Linseed | BDA | 40.41 | 590 | ± | 99 | 26 | ± | 6 |
|  | PDA | 41.92 | 335 | ± | 23 | 53 | ± | 2 |
|  | ODA | 50.38 | 103 | ± | 11 | 57 | ± | 1 |
| Algae-PUFA (46%) | BDA | 2.68 | 1 | ± | 0 | 51 | ± | 7 |
|  | PDA | −15.01 | 1 | ± | 0 | 46 | ± | 4 |
| Algae-PUFA (67%) | BDA | 51.7 | 570 | ± | 41 | 7 | ± | 1 |
|  | PDA | 45.67 | 464 | ± | 9 | 16 | ± | 1 |

BDA: butane diamine; PDA: pentane diamine; ODA: octane diamine

Production of NIPU Foams

In the historical isocyanate-based PU foam production, water is added to react with the isocyanate to produce $CO_2$ as a blowing reagent. An important distinguishing aspect of PU foam production is the ability of this chemistry to match the polymer curing rate to the rate of $CO_2$ generation, so that the $CO_2$ bubbles generated can be simultaneously trapped in the polymer network, producing foam. If the $CO_2$ generation rate is much higher than the curing rate, the bubbles may coalesce and/or escape from the polymer before the curing process can trap them in the solidifying polymer network. On the other hand, if the $CO_2$ generation rate is much slower than curing process, insufficient bubbles will be produced to make the foam.

The same principle applies to non-isocyanate PU foam production. We have invented a unique process for producing NIPU foam using a diamine carbamate as a bifunctional blowing and curing reagent. The diamine carbamate is not reactive with cyclic carbonates and can be mixed and/or stored with cyclic carbonates without degradation/reaction of either. However, when polymerization is desired, the reaction mixture may be heated, resulting in the decomposition of the diamine carbamate to produce $CO_2$ gas and the diamine, where the released diamine can immediately react with the cyclic carbonate, producing NIPU polymer. As stated above, it is important that the cyclic carbonate react with the diamine fast enough to trap the newly released $CO_2$ bubbles before they can coalesce and/or escape from the reacting mixture. PUFA derived cyclic carbonate can serve as a good feedstock in this case, due to its high reactivity. Adding catalyst can also help to improve the morphology of the foam product.

As described herein, in some embodiments of the present disclosure, $CO_2$ was bubbled through butane diamine (BDA) to produce a solid carbamate intermediate which precipitated early in the reaction, which was sequentially ground into a fine powder. The powdered carbamate was mixed with carbonated linseed oil at room temperature. The carbonated oil consisted of 90% of carbonated linseed triglyceride (TAG) and 10% of carbonated linseed fatty acid methyl ester (FAME). The resultant mixture was placed in a preheated oven at a temperature between about 140° C. and about 160° C., resulting in foaming and polymerization and the production of foamed NIPUs. Under this condition, the carbamate decomposed into the starting diamine and released $CO_2$, which behaved as a blowing reagent. The liberated diamine simultaneously reacted with carbonate groups to form polyurethane polymer foam. After about one hour, the foam product was fully set and cured. In some embodiments of the present disclosure, $CO_2$ was bubbled through ethylene diamine (EDA) to produce carbamate, which can be a viscous liquid.

Figure 3:
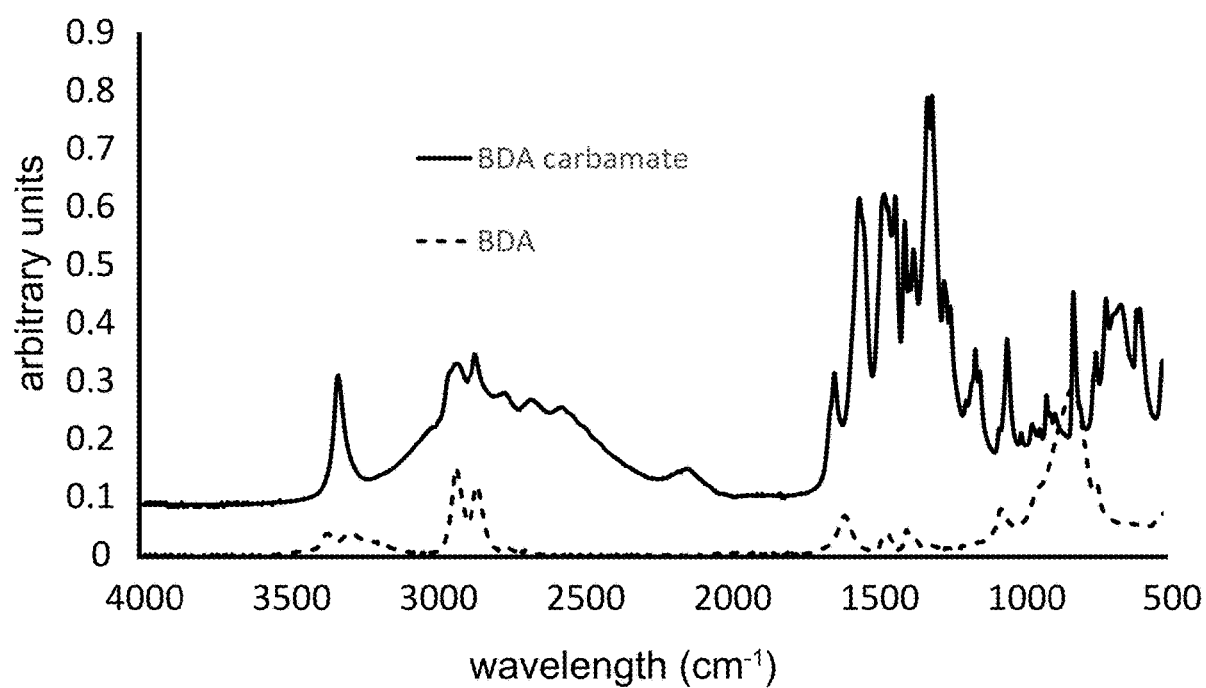
FIG. 3 illustrates FTIR scans of butane diamine and butane diamine carbamate, according to some embodiments of the present disclosure.
Figure 4:
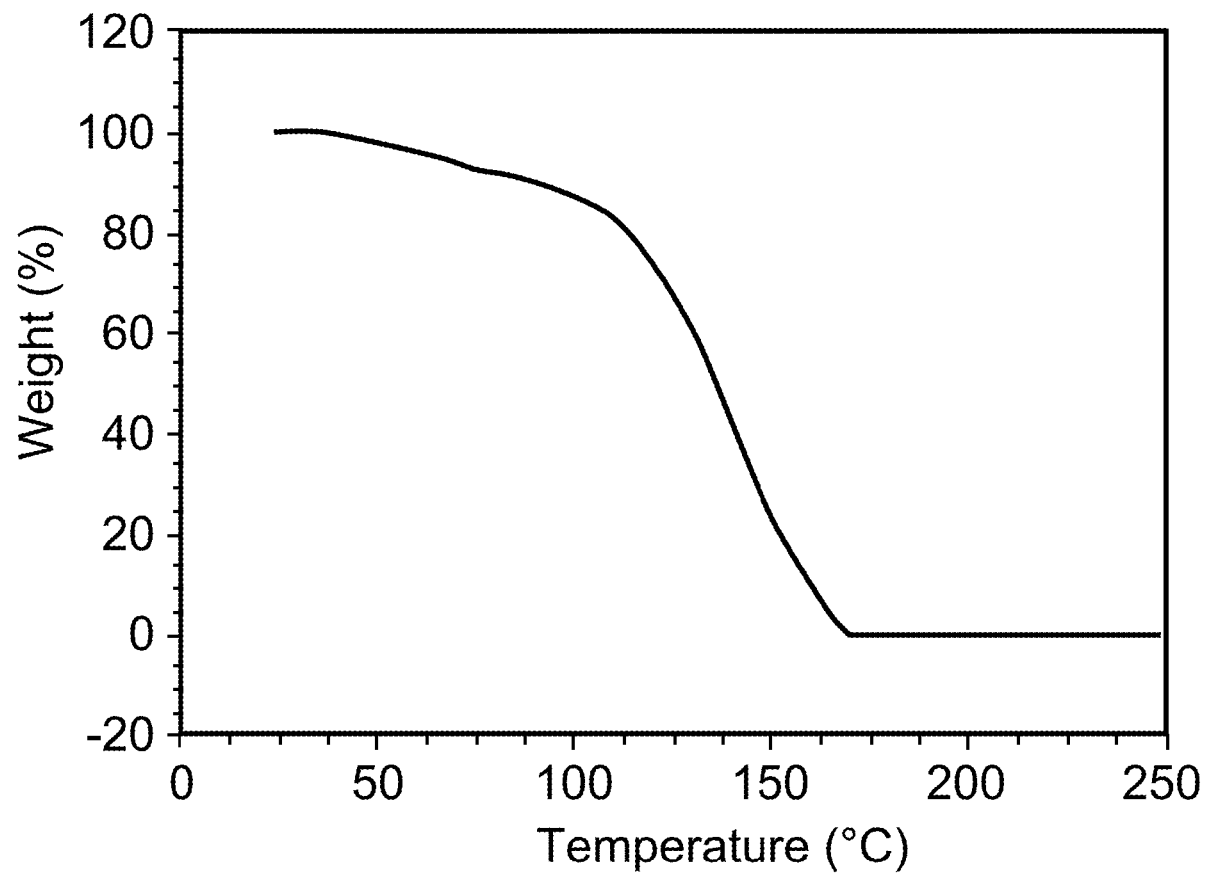
FIG. 4 illustrates thermal gravimetric analysis (TGA) results of thermally decomposing butane diamine carbamate, according to some embodiments of the present disclosure.

FIG. 3 illustrates FTIR scans of butane diamine and butane diamine carbamate. The peak at 1315 cm-1 indicates the carbamate group NCOO-stretching vibration. This peak corresponds to carbamate formation. The solid BDA carbamate was analyzed by TGA and the results are shown in FIG. 4. The BDA carbamate started to lose weight at about 50° C., probably due to the release of physically entrapped $CO_2$. The weight of the BDA carbamate started to drop significantly at about 120° C., indicating that the BDA carbamate thermally decomposed at about this temperature. The BDA carbamate completely decomposed and/or evaporated at about 165° C., which is very close to its boiling point (~158° C.). TGA of EDA derived carbamate shows that this carbamate started to lose weight at ~63° C., and the weight dropped quickly at about 100° C. Compared to the BDA carbamate, the EDA carbamate released $CO_2$ at a much lower temperature. The reactivity of EDA was also much faster than BDA. Therefore, the free EDA reacted with cyclic carbonate much faster, and the released $CO_2$ had a shorter time to coalesce, thereby producing a foam structure having much smaller bubble sizes.

Figure 5:
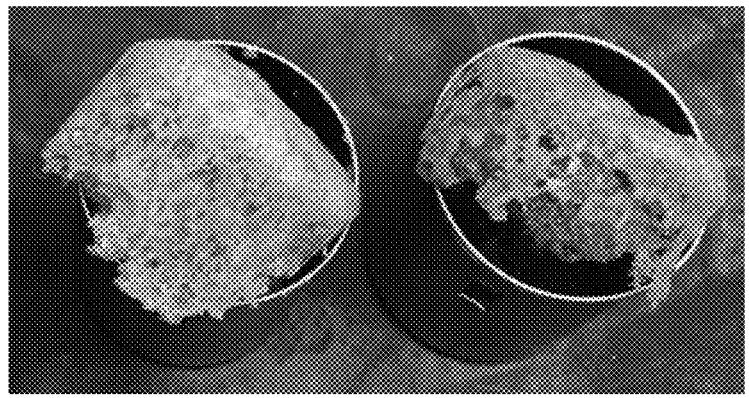
FIG. 5 illustrates photographs of (top) NIPU foam product (left-foamed and cured at 140° C., right-foamed and cured at 160° C.) and (bottom) NIPU foam product foamed and cured at 140° C., according to some embodiments of the present disclosure.
Figure 5:
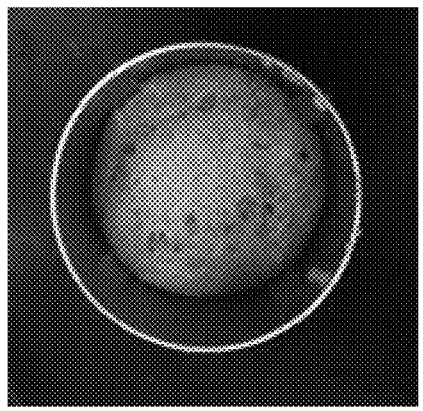
Figure 5:
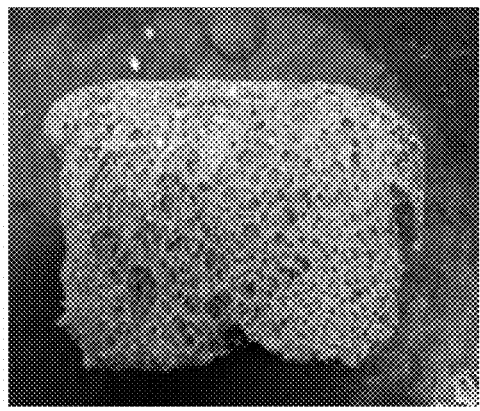

Neither an amine carbonate or an amine bicarbonate salt can react with cyclic carbonated groups to produce urethane, until the carbamate and/or diamine bicarbonate starts to decompose. Therefore, the carbamate may be pre-mixed with carbonated monomers before foam production. This is very convenient for foam manufacture. Once production of the foamed NIPU is desired, the mixture can be placed into a mold and heated to a predefined target temperature to initiate the foaming and curing process to produce the foam products. Once the carbamate starts to decompose at elevated temperatures, the $CO_2$ will behave as a blowing reagent, while the released diamine will react with carbonated groups to form a crosslinked network. The foaming and curing will occur essentially simultaneously. Photographs of exemplary foamed NIPU products are shown in FIG. 5.

Figure 6:
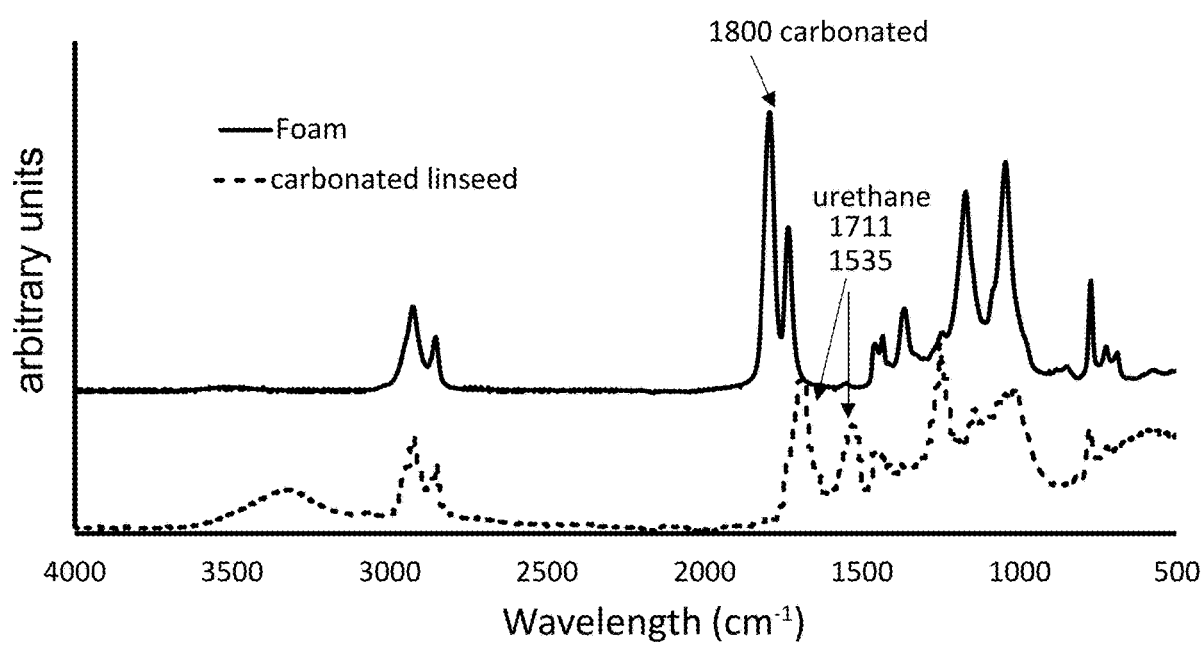
FIG. 6 illustrates FTIR scans of a foamed NIPU product, according to some embodiments of the present disclosure.
Figure 7:
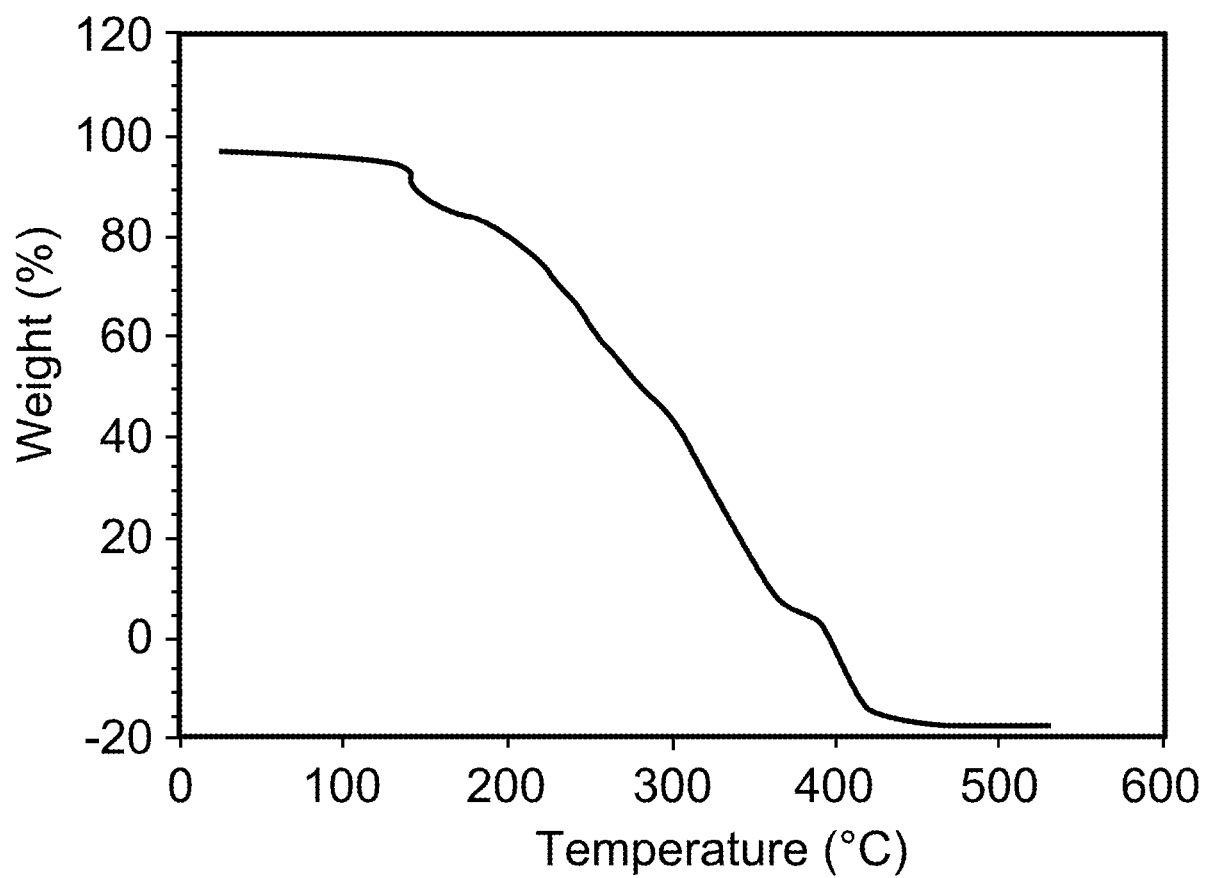
FIG. 7 illustrates TGA results of a foamed NIPU product, according to some embodiments of the present disclosure.
Figure 8:
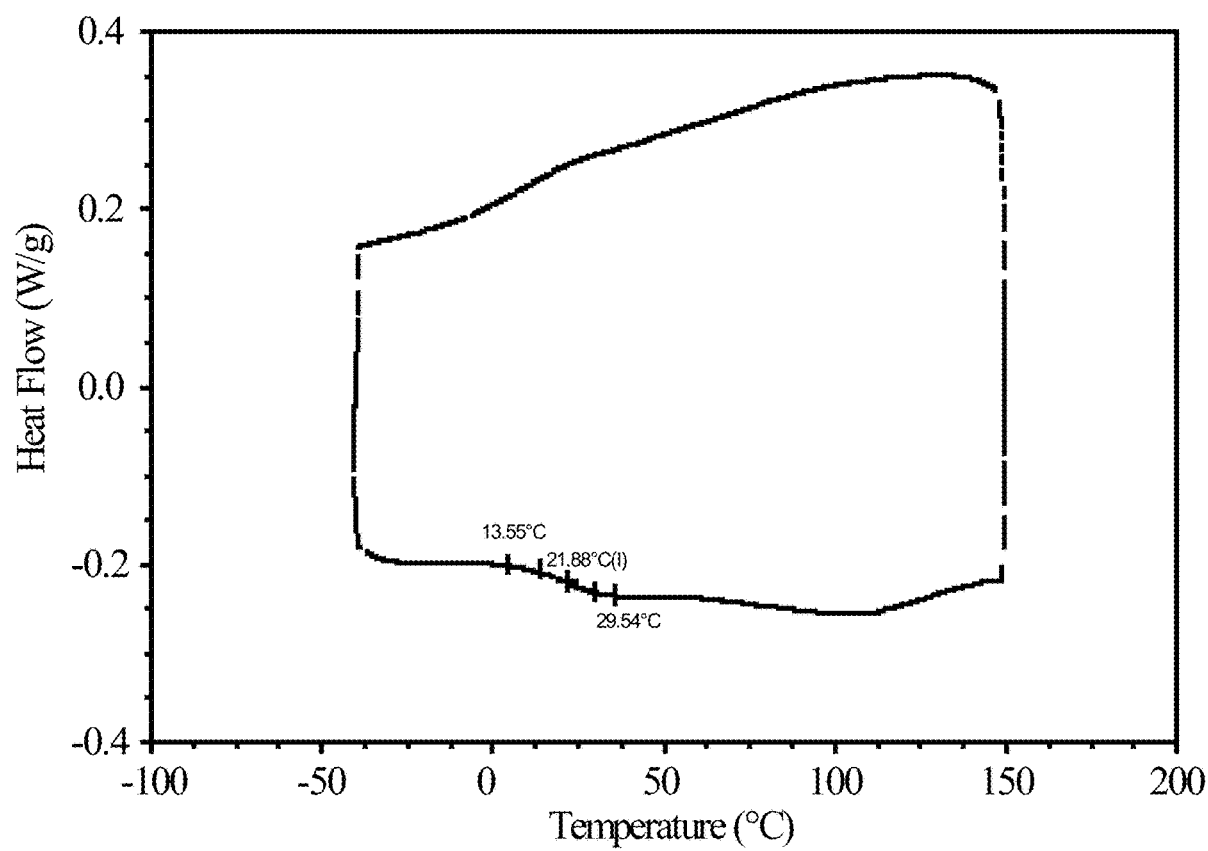
FIG. 8 illustrates dynamic scanning calorimetry (DSC) results of a foamed NIPU product, according to some embodiments of the present disclosure.

As shown in FIG. 6, after the carbamate degraded to produce the $CO_2$ blowing reagent and diamine, almost all the carbonate groups reacted with the diamine. There are very strong signals indicating urethane linkages in the resultant foam product. Further, TGA data (see FIG. 7) illustrate a weight drop at 165° C., probably due to the unreacted BDA carbamate. The foam started to loss polymer weight around 200° C., and lost all the weight around 420° C. The DSC data (see FIG. 8) illustrate a glass transition temperature (Tg) for the foam product is 21.9° C. Further, the density of the foam was calculated to be about 0.114 g/cm$^3$.

Figure 9:
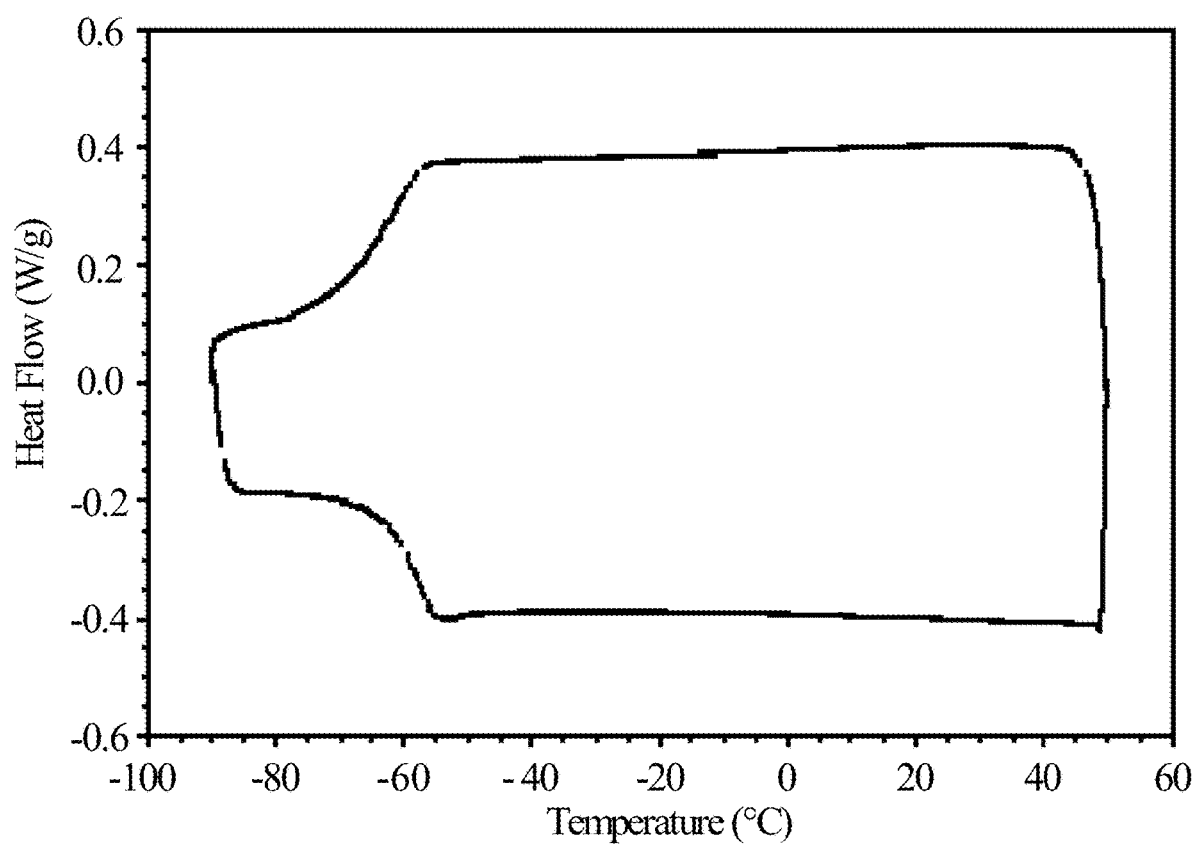
FIG. 9 illustrates DSC results from the reaction of ethylene diamine (EDA) with carbamate, according to some embodiments of the present disclosure.
Figure 10:
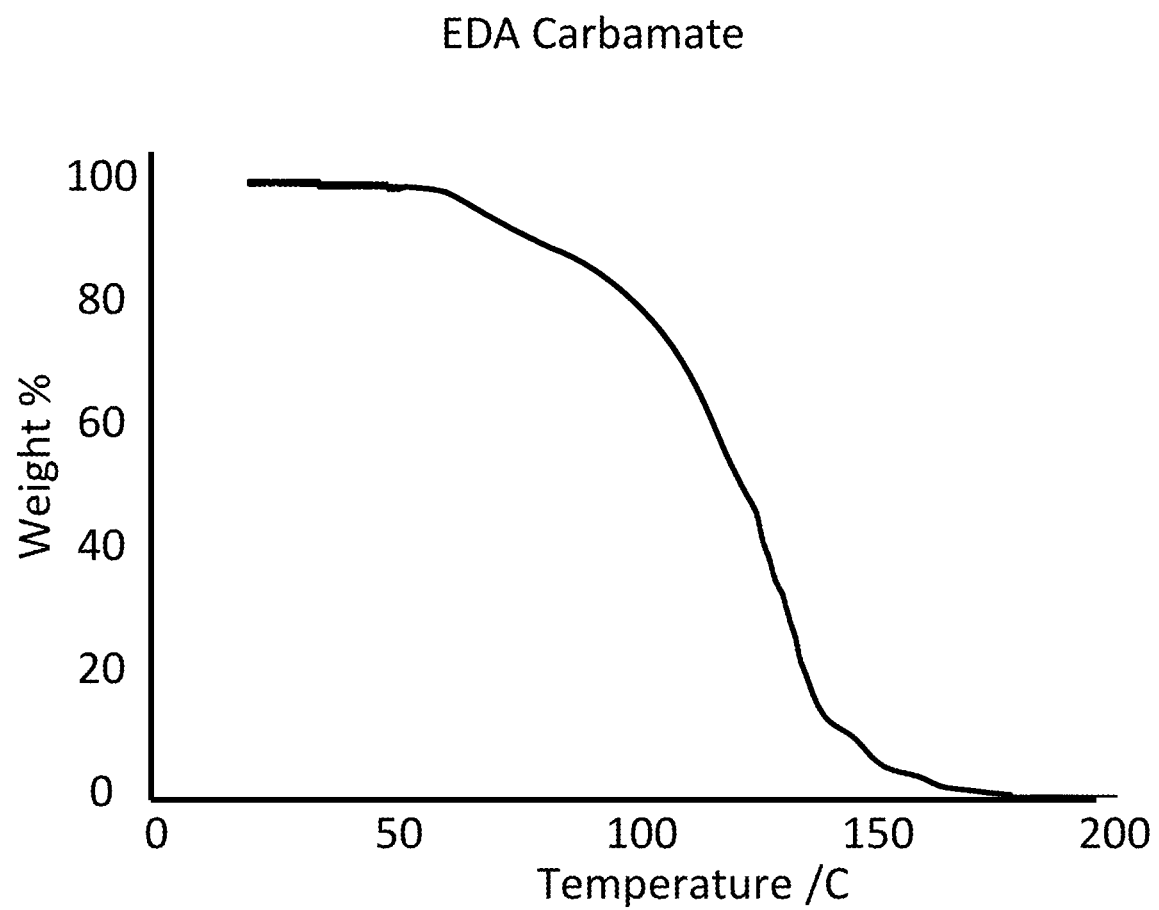
FIG. 10 illustrates TGA results of EDA carbamate, according to some embodiments of the present disclosure.
Figure 11:
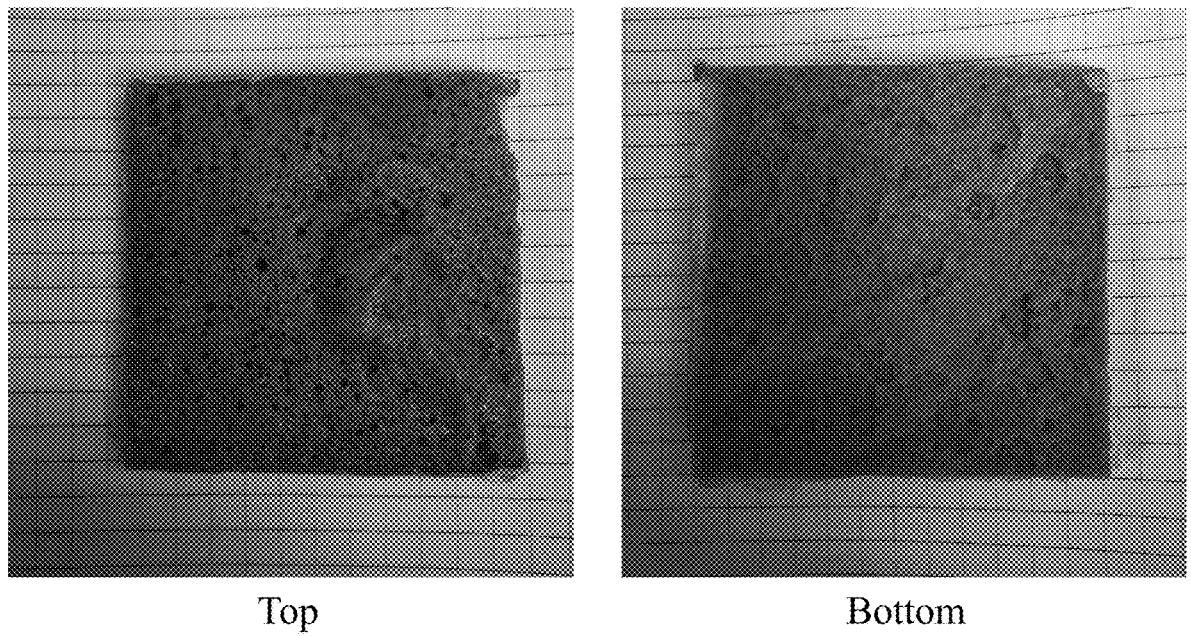
FIG. 11 illustrates photographs of NIPU foam produced from cyclic carbonate and EDA carbamate, according to some embodiments of the present disclosure.

FIGS. 9, 10, and 11 summarize additional experimental results directed to producing NIPU foams using liquid ethylene diamine (EDA) carbamate reacted with a lipid (i.e., oil) mixture of a carbonated linseed oil triglyceride and a carbonated linseed oil FAME at a 9:1 weight ratio, respectively. In general, EDA was reacted with $CO_2$ to produce an amine carbamate salt as shown above in Reaction 2. This particular carbamate is a liquid at room temperature (e.g., about 20° C.). The reaction conditions were as follows: 9 g of carbonated linseed TAG, 1 g of carbonated linseed FAME, 2.2 g of EDA carbamate, 0.05 g of TBD catalyst. The mixture was put directly in a preheated oven at 120° C. The mixture started to foam up within about 1 minute. The foam was taken out of the oven after 30 minutes. The foam was flexible when it was still at about the reaction temperature and became rigid when it cooled down to room temperature. The reaction was catalyzed using about 0.5 wt % of triazabicyclodecene. As shown by the TGA data in FIG. 10, the EDA carbamate started to decompose to $CO_2$ gas and the starting EDA at about 100° C. The freed EDA then began to react with the carbonate groups of the lipid. As described above, the $CO_2$ behaved as a blowing agent during the reaction. The resultant NIPU foam appeared to be cured after about 30 minutes, at which point it had the characteristics of a flexible foam. The cells of the resultant foam can include at least one of open cells and/or close cells, depending on the specific reaction conditions and starting materials used.

FIG. 9 illustrates DSC data collected for the decomposition (i.e., melting point) of the EDA carbamate. This figure illustrates that EDA carbamate has a melting point of about −54° C. In contrast, butane diamine (BDA) carbamate is still a solid at room temperature. The use of a liquid carbamate provides, among other things, processing advantages. These advantages include easier transfer of the carbamate from storage to reaction using pumps and, once delivered to the reaction, easier mixing with the cyclic carbonate monomer. FIG. 10 illustrates TGA data collected for the decomposition of the EDA carbamate. This shows that EDA carbamate starts to decompose to $CO_2$ and EDA at about 63° C. and the weight drops rapidly around 100° C. This is a relatively low temperature range for decomposition compared to BDA carbamate. In addition, the released EDA has much faster reaction kinetics with carbonate groups. The faster reaction kinetics combined with the lower temperature release of the amine and $CO_2$ results in the $CO_2$ forming smaller bubbles resulting in a final foam structure having smaller void spaces. FIG. 11 illustrates photographs of one example of the final NIPU foam resulting from the procedures described above. Density of the final foam was between about 0.17 g/cm$^3$ and about 0.35 g/cm$^3$. These experiments show that the final morphology of NIPU foam varies depending on the carbamate used. For example, a diamine having a higher reactivity (e.g., EDA) results in a more closed cell structure having smaller bubble sizes; e.g., cell sizes between about 0.05 mm and about 0.5 mm in diameter.

Figure 13:
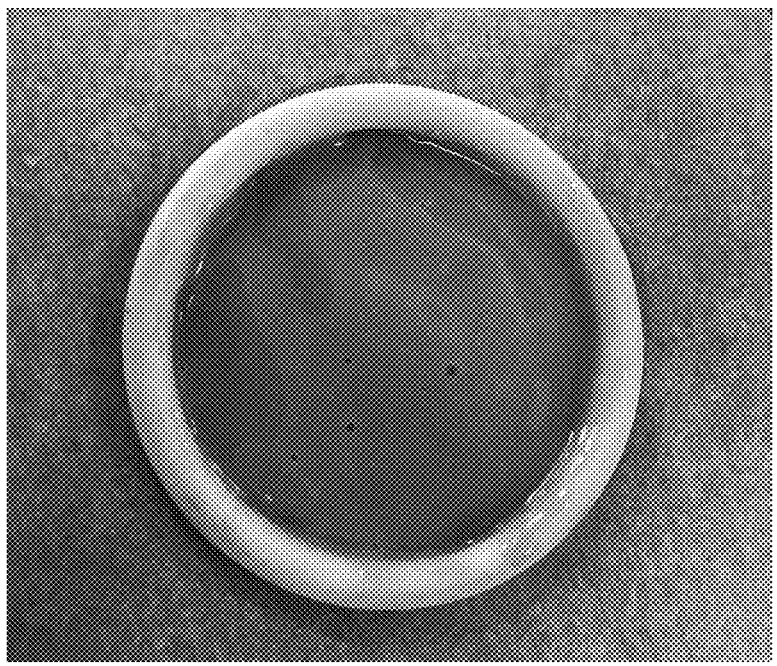
FIG. 13 illustrates a NIPU foam before heating resulting in decomposition of the reactant to release $CO_2$ and the diamine and after heating, according to some embodiments of the present disclosure.
Figure 13:

FIG. 13 illustrates an exemplary NIPU foam produced according to the following formulation: 9 g carbonated linseed TAG, 1 g of carbonated GE25, 2.3 g of EDA carbamate, 0.05 g catalyst. This formulation was heated in an oven at about 120° C. and started to foam after about one minute. The NIPU foam was fully cured after about 30 minutes, resulting in a final density of about 0.1 g/cm$^3$.

Materials and Methods

Materials: Soybean oil (J61399-K2) and potassium iodide (KI) were purchased from Alfa Aesar (MA, USA). Linseed oil, methyl oleate (C18:1), methyl linoleate (C18:2), methyl linolenate (C18:3), Amberlite IR-120, 30% hydrogen peroxide, tetrabutylammonium bromide (TBAB), Wijs solution, butane diamine (BDA), pentane diamine (PDA), octane diamine (ODA), hexamethylene diamine (HMDA), and triazabicyclodecene (TBD) were purchased from SigmaAldrich (MO, USA). Thrive culinary algae oil (algae-mono) was produced by Corbion (Peoria, IL). High PUFA algal oil (alphamega$^3$ 400, algae-PUFA) was purchased from Algarithm (Canada).

Epoxidation: The oil sample, toluene, Amberlite IR-120 and acetic acid were sequentially fed into a three-neck flat bottom flask (the weight ratio of oil sample: toluene:resin=1: 0.5:0.25), which was placed in a water bath placed on a magnetic hotplate. Hydrogen peroxide was added dropwise (mole ratio of hydrogen peroxide:acetic acid:double bonds=1.5:0.5:1.0). This is an exothermic reaction; ice was used to reduce temperature and avoid overheating when hydrogen peroxide was added. The reaction was carried out at a temperature between about 60° C. and about 70° C. for up to 12 hours under strong stirring. After the reaction, the mixture was dissolved in 200 mL of ethyl acetate and filtered to remove resin. The liquid mixture was transferred into a separatory funnel and washed with water at least five times until the pH was neutral. Anhydrous $Na_2SO_4$ was added to the organic phase to remove water. Solvent was removed using rotatory evaporation at 90° C. at 5 mbar vacuum.

Carbonation: Epoxidized oil and TBAB (0.05 mol per mol of epoxy groups) were placed in a 600 mL Parr reactor, stirred, and heated under 500 psi of $CO_2$. The reactions were carried out at 110° C. for 1 hour, and then 140° C. for 22 hours. The $CO_2$ was continuously fed into the reactor using a $CO_2$ cylinder during the reaction. After the reaction, carbonated oil was transferred into a separation funnel and ethyl acetate was added to dissolve the oil. DI water was used to wash the organic solution three times to remove TBAB. Solvent was removed by rotatory evaporation at 90° C. under 5 mbar vacuum. The number of carbonate groups per triglyceride was calculated from the initial and final epoxy oxygen content (EOC), assuming no side reactions.

Kinetics study: Carbonated oil sample was added into a glass tube, which was placed in an oil bath at 70° C. The oil was constantly stirred using an overhead mechanical mixer. A stoichiometric amount of diamine was added for to carry out the reaction. Small samples were removed from the tube and quenched in liquid nitrogen for ATR-FTIR analysis over the reaction.

Resin preparation: Carbonated oil samples were weighed into a flask and stirred under vacuum for 30 min in an oil bath at 70° C. Stoichiometric amounts of diamine were added to the carbonated oil and the mixture was kept stirring for a time period between about 1 minute and about 5 minutes until the mixture started to become a gel. The mixture was then poured into a preheated PTFE model to cast dog bone shaped resins (ASTM D638 Type II). The resins were cured in an oven at 70° C. for 15 hours, then 100° C. for 15 hours.

NIPU foam production: Butane diamine (BDA) was heated to 40° C. to be melted. $CO_2$ was bubbled through the liquid BDA to produce carbamate salt, which was a white solid. The solid carbamate was grinded in a mortar to produce fine powder. The carbamate powder was well mixed with a carbonated oil, for example 90% carbonated linseed triglyceride (TAG) and 10% carbonated linseed fatty acid methyl ester (FAME), until a white slurry was obtained. The mixed slurry was poured into a mold, and the mold was placed into a preheated oven at a temperature between about 140° C. and about 160° C. for 60 min to produce the foam. After about one hour the foam product was fully set and cured.

FAME was synthesized by reacting linseed triglyceride oil with methanol (at a mole ratio of about 1:30 of triglyceride:methanol), using NaOH as a catalyst at a reaction temperature of about 60° C. for about 5 hours. The resultant FAME was then epoxidized and carbonated to produce carbonated linseed FAME. The viscosity of carbonated FAME is much lower than carbonated linseed triglyceride. By mixing carbonated linseed FAME with carbonated linseed TAG, it is easier process the oil with the carbamate salt. Also, the incorporation of carbonated FAME into the carbonated TAG can make the final produce more flexible.

Analytical methods: The fatty acid composition in the oil samples was tested using NREL FAME protocol. The unsaturated degree in the oil samples were measured as iodine value (IV), using the classis Wijs method. Epoxy oxygen content (EOC) was obtained by following AOCS standard test method Cd 9-57. All the oil and resin samples were characterized by a Nicolet iS50 Fourier Transform Infrared Spectroscopy (FTIR) with Attenuated Total Reflectance (ATR) from 4000 to 650 $cm^{-1}$. 32 scans were taken with resolution of $4^{-1}$ cm. Viscosity measurement was done by Brookfield viscometer DV2T model with Cone type, CPE 40 for low viscosity oil and CPE 52 for high viscosity oil. The measurements were taken with the rotational speed of 5-0.1 rpm at 70±3° C. Samples of 5-15 mg were used in temperature degradation study was done using TA's Thermogravimetric Analysis (TGA) Q500 model with heating rate of 15° C./min under nitrogen gas atmosphere. Thermal glass transition (Tg) was measured using TA's Dynamic Scanning calorimetry (DSC) Q2000 model. Modulated DSC (MDSC) was run with a sample size of 10-20 mg, amplitude of 1.3° C., 60 sec cycle and 2° C./min heating rate. Dynamic Mechanical Analysis (DMA) measurement was done with TA Q800. Multi-Frequency-Strain with ramp rate of 3° C./min amplitude of 15 μm and frequency of 1 Hz. Room-temperature tensile tests (ASTM D638) were done using an Instron 4465 Tension Frame. Specimens were subjected to extension at a rate of 5 mm/min until breakage occurred. Tensile properties are reported as average values of three tests. Swelling tests in toluene and water were carried out at room temperature at a solvent to sample weight ratio of 50:1.

Whether or not a reactant or product described herein is "bioderived" may be determined by analytical methods. Using radiocarbon and isotope ratio mass spectrometry analysis, the bio-based content of materials can be determined. ASTM International, formally known as the American Society for Testing and Materials, has established a standard method for assessing the biobased content of carbon-containing materials. The ASTM method is designated ASTM-D6866. The application of ASTM-D6866 to derive a "biobased content" is built on the same concepts as radiocarbon dating, but without use of the age equations. The analysis is performed by deriving a ratio of the amount of radiocarbon (14C) in an unknown sample to that of a modern reference standard. The ratio is reported as a percentage with the units "pMC" (percent modern carbon). If the material being analyzed is a mixture of present-day radiocarbon and fossil carbon (containing no radiocarbon), then the pMC value obtained correlates directly to the amount of biomass material present in the sample. Thus, ASTM-D866 may be used to validate that the compositions described herein are and/or are not derived from renewable sources.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A method for making a non-isocyanate polyurethane (NIPU) foam, the method comprising:
    decomposing a blowing agent comprising at least one of an amine carbamate salt or an amine bicarbonate salt to form a diamine and $CO_2$ in the presence of a molecule comprising a plurality of cyclic carbonate functional groups; and
    reacting the diamine with at least a portion of the cyclic carbonate functional groups to form the NIPU foam.

2. The method of claim 1, wherein the reacting and the decomposing occur at substantially the same rate.

3. The method of claim 1, wherein the molecule comprising a plurality of cyclic carbonate functional groups is derived from a biomass.

4. The method of claim 1, wherein the molecule comprising a plurality of cyclic carbonate functional groups is derived from at least one of a soybean oil, a linseed oil, or an algae oil.

5. The method of claim 1 wherein the molecule comprising a plurality of cyclic carbonate functional groups is produced by carbonating an unsaturated lipid or oil.

6. The method of claim 1, wherein the NIPU foam has a density between about 0.01 $g/cm^3$ and about 0.80 $g/cm^3$.

7. The method of claim 1, wherein the decomposing is accomplished by heating.

8. The method of claim 7, wherein the heating is performed by at least one of conductive heating, radiative heating, or radio frequency heating.

9. The method of claim 7, wherein the heating results in a temperature between about 50° C. and about 200° C.

10. The method of claim 1, wherein the diamine comprises between 1 and 10 carbon atoms.

11. The method of claim 1, wherein the diamine is selected from the group consisting of a substituted or unsubstituted diaminoalkane.

12. The method of claim 1, wherein:
    the NIPU foam comprises the structure

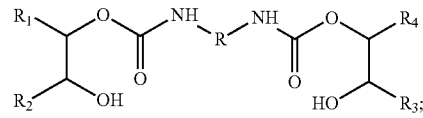

wherein:
    each of $R_1$, $R_2$, $R_3$, and $R_4$ are independently selected from functional groups comprising at least one of hydrogen or carbon, and
    R is a linking group comprising carbon.

13. The method of claim 12, wherein the linking group further comprises at least one of nitrogen, oxygen, phosphorus, or sulfur.

14. The method of claim 12, wherein:
    $R_1$ and $R_2$ taken together with the carbons to which they are attached form a lipid residue, and $R_3$ and $R_4$ taken together with the carbons to which they are attached form a lipid residue.

15. The method of claim 14, wherein at least one of the lipid residues is a substituted triglyceride.

16. The method of claim 12, wherein at least one functional group further comprises at least one of a nitrogen, oxygen, phosphorus, or sulfur.

* * * * *